United States Patent
Gormerley

(10) Patent No.: US 7,297,009 B1
(45) Date of Patent: Nov. 20, 2007

(54) PROTECTIVE PLATE KIT FOR CABLES AND THE LIKE

(76) Inventor: Holmes J. Gormerley, 7 Affirmed La., Howell, NJ (US) 07731

( * ) Notice: Subject to any disclaimer, the term of this patent is extended or adjusted under 35 U.S.C. 154(b) by 0 days.

(21) Appl. No.: 11/483,766

(22) Filed: Jul. 11, 2006

(51) Int. Cl.
*H01R 4/60* (2006.01)

(52) U.S. Cl. .................................. 439/212

(58) Field of Classification Search ............. 439/212, 439/120, 131, 94, 535, 637, 536, 537, 538; 52/232; 174/505; 248/56
See application file for complete search history.

(56) References Cited

U.S. PATENT DOCUMENTS

| | | | |
|---|---|---|---|
| 4,249,353 A | 2/1981 | Berry | |
| 4,419,535 A | 12/1983 | O'Hara | |
| D275,831 S | 10/1984 | Legerius et al. | |
| 4,936,064 A | 6/1990 | Gibb | |
| 5,122,069 A * | 6/1992 | Brownlie et al. | 439/131 |
| 5,184,793 A | 2/1993 | Heidt | |
| 5,350,316 A * | 9/1994 | Van Wagener et al. | 439/460 |
| 5,417,019 A | 5/1995 | Marshall et al. | |
| 6,353,180 B1 * | 3/2002 | DeBartolo et al. | 174/483 |
| 6,483,028 B2 * | 11/2002 | DeBartolo et al. | 174/483 |
| 7,082,729 B2 * | 8/2006 | Cole et al. | 52/220.8 |
| 7,128,585 B2 * | 10/2006 | Evilsizer | 439/120 |
| 2005/0221646 A1 * | 10/2005 | Evilsizer | 439/120 |

* cited by examiner

*Primary Examiner*—Chandrika Prasad

(57) ABSTRACT

A kit includes a trim plate that has rigid sections arranged end-to-end, defining a cavity within an inner perimeter thereof. Each section has a corresponding beveled edge outwardly sloping away from the inner perimeter. A core member has a unitary body formed from deformably resilient material and is registered between the rigid sections, beneath the floor surface. Mounting flanges are aligned along the inner perimeter of the trim plate and abuts the outer perimeter of the core member. Each mounting flange has ribs that inwardly protrude into the core member and extend along an entire length thereof. The ribs are coupled with the core member so that same is prohibited from downwardly traveling beneath the floor surface. Computer cables pass through the core member, causing same to expand against the mounting flanges and constrict air gaps created within the core member when the cables are passed below the floor surface.

15 Claims, 2 Drawing Sheets

PROTECTIVE PLATE KIT FOR CABLES AND THE LIKE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a protective plate kit and, more particularly, to a protective plate kit for cables and the like for providing a barrier through which cables are channeled from one room to another room.

2. Prior Art

During construction of buildings, it is necessary to provide openings through the building floors and walls to permit the running of piping, conduits, and cable systems. Many different types of fitting and coupling devices have been used for this purpose. These devices have varied from simple removable forms to permanently installed boxes and housings of complex design.

It has become known heretofore to use devices for feeding or passing cables through walls which are formed with openings corresponding to the size of the cables and, if necessary or desirable, have sealing means in order to provide protection against dust and water. However, such devices provide no means for protection against fire, or for maintaining the integrity of a firewall already in place.

Generally, however, whether of simple or complex design, the currently available devices are often very labor intensive. Their labor intensive nature is particularly evident during the installation of code required fire-stop materials after the piping and conduit systems have been installed. Typically, it has been necessary to caulk or trowel intumescent materials about the pipes and conduits where they pass through the partition fitting and coupling devices.

Accordingly, a need remains for a protective plate kit for cables and the like in order to overcome the above noted shortcomings. The present invention satisfies such a need by providing a protective plate kit that is easy to install and use, light weight, optimally sized and reasonably priced. Such a protective plate kit for cables and the like will provide a quick seal for the open areas in a floor surface around computer cables and other conduits. The foam present in the kit will further provide protection against fire damage which is greatly appreciated by contractors and individuals responsible for the operation of high-level computer rooms.

BRIEF SUMMARY OF THE INVENTION

In view of the foregoing background, it is therefore an object of the present invention to provide a protective plate kit for cables and the like. These and other objects, features, and advantages of the invention are provided by a kit for providing a barrier through which cables can be directed from one room to another room.

The kit includes a trim plate that has a plurality of rigid sections contiguously arranged end-to-end and spanning across a floor surface such that the rigid sections effectively defines a cavity within an inner perimeter of the rigid sections. Each of the rigid sections has corresponding beveled edges outwardly sloping away from associated ones of the inner perimeters.

A core member has a single and unitary body formed from deformably resilient material. Such a core member is centrally registered between the rigid sections and is disposed beneath the floor surface. The core member is preferably formed from foam rubber and occupies an entire surface area between the inner perimeters of the trim plate.

A plurality of mounting flanges are symmetrically aligned along the inner perimeters of the trim plate and directly abuts the outer perimeter of the core member. Each of the mounting flanges may be removably engageable with the core member and corresponding ones of the rigid sections of the trim plate. Each of the mounting flanges is provided with a plurality of monolithically formed ribs that inwardly protrude into the core member. Such ribs effectively penetrate the core member and extend along an entire vertical length of the core member.

The ribs are coextensively shaped and are directly coupled with the core member in such a manner that the core member is advantageously and effectively prohibited from downwardly traveling beneath the floor surface. A plurality of computer cables are removably passed through the core member, thereby causing the core member to laterally expand against the mounting flanges and constrict air gaps created within the core member when the computer cables are passed below the floor surface and into the core member.

Each of the mounting flanges preferably includes a top surface that is disposed above corresponding ones of the rigid plates. Such mounting flanges have respective longitudinal lengths extending downwardly to a bottom surface of the core member. Each of the mounting flanges may be vertically registered along a vertical plane defined subjacent to the floor surface.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
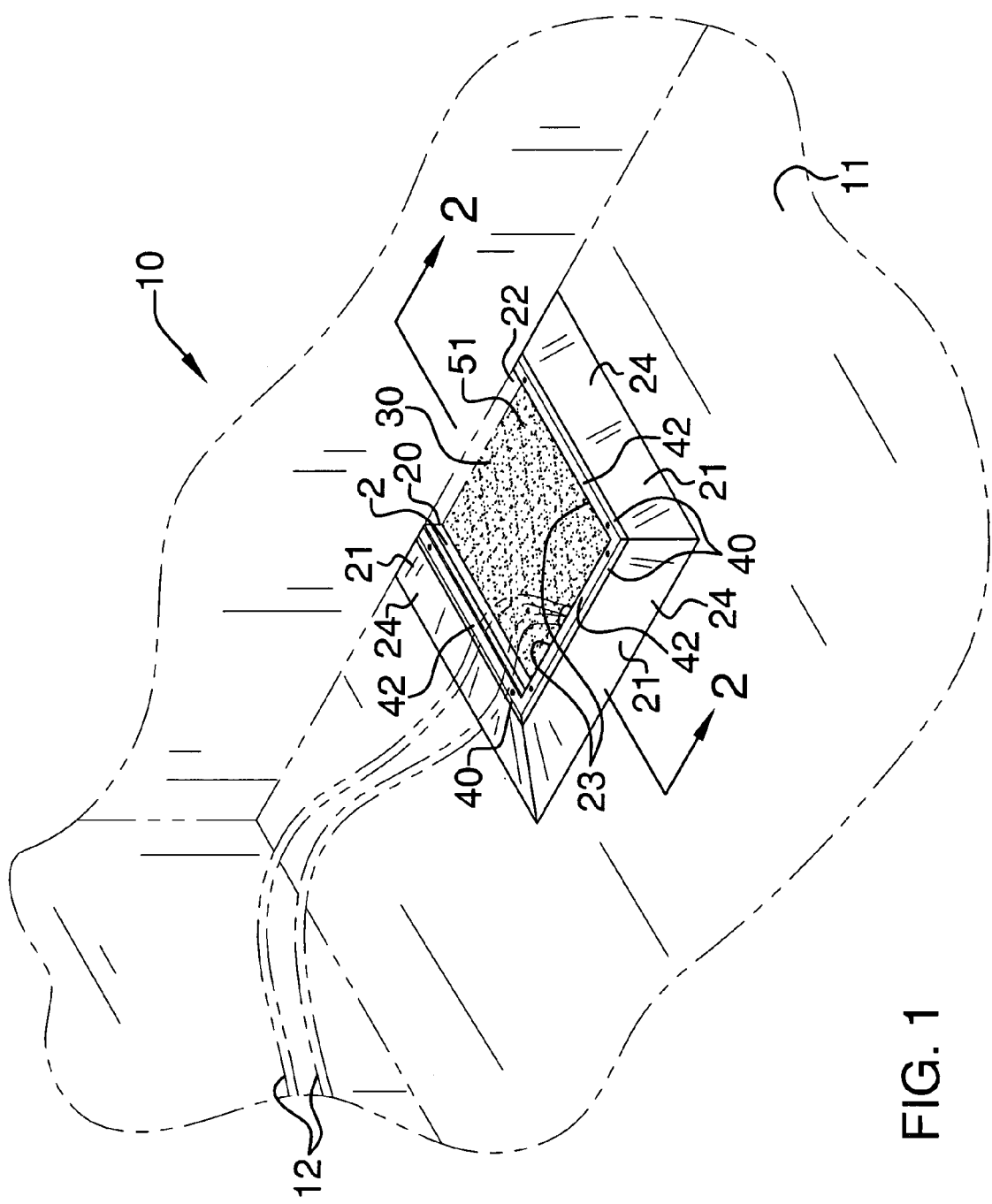
FIG. 1 is a perspective view showing a protective plate kit for cables and the like, in accordance with the present invention.
Figure 2:
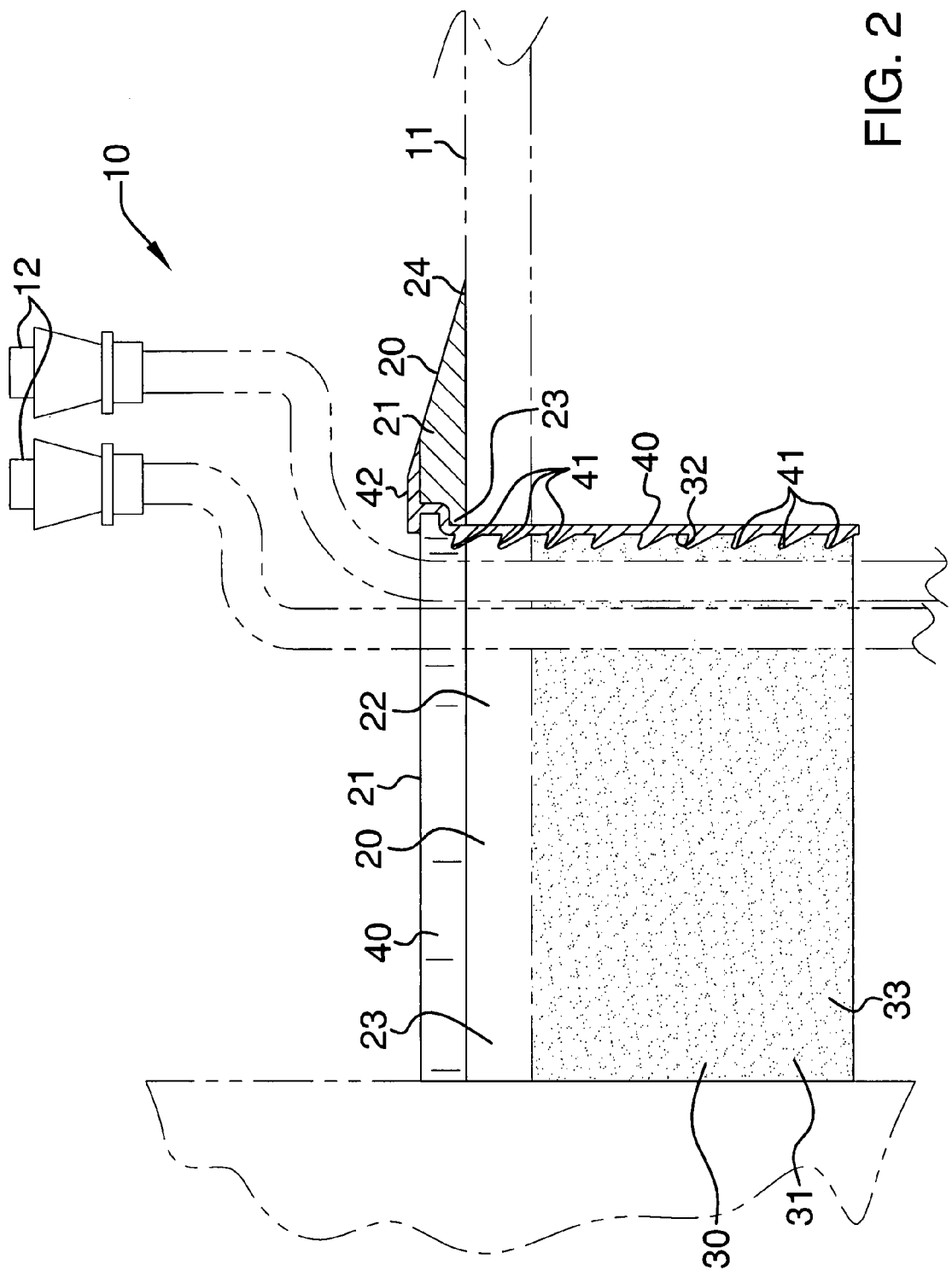
FIG. 2 is a cross-sectional view of the assembly shown in FIG. 1, taken along line 2-2.

The kit of this invention is referred to generally in FIGS. 1-2 by the reference numeral 10 and is intended to provide a protective plate for cables and the like. It should be understood that the kit 10 may be used to protect many different types of structures passing through a wall, such as water lines, and should not be limited to only electrical cables.

Referring initially to FIGS. 1 and 2, the kit 10 includes a trim plate 20 that has a plurality of rigid sections 21 contiguously arranged end-to-end and spanning across a floor surface 11 such that the rigid sections 21 effectively defines a cavity 22 within an inner perimeter 23 of the rigid sections 21. Each of the rigid sections 21 has a corresponding beveled edge 24 outwardly sloping away from associated ones of the inner perimeters 23. Such beveled edges 24 are important for conveniently eliminating any raised surface against which a person may inadvertently strike their foot and trip, or against which other items in the vicinity of the kit 10 may become caught while being moved across the floor surface 11.

Again referring to FIGS. 1 and 2, a core member 30 has a single and unitary body 31 formed from a deformably resilient material. Of course, the core member 30 may be produced from a variety of suitable materials, as is obvious to a person of ordinary skill in the art. Such a core member 30 is centrally registered between the rigid sections and is disposed beneath the floor surface 11. The core member 30 is formed from foam rubber and occupies an entire surface area between the inner perimeters 23 of the trim plate 20. The core member 30 is vital for advantageously defining a fire-resistant barrier through which the cables 12 are directed. Such a fire resistant barrier advantageously protects adjacent rooms from a growing fire, thus minimizing the damage in the event that a fire does occur.

Still referring to FIGS. 1 and 2, a plurality of mounting flanges 40 are symmetrically aligned along the inner perimeters 23 of the trim plate 20 and directly abuts, without the use of intervening elements, the outer perimeter 32 of the core member 30. Each of the mounting flanges 40 is removably engageable with the core member 30 and corresponding ones of the rigid sections 21 of the trim plate 20. Each of the mounting flanges 40 is provided with a plurality of monolithically formed ribs 41 that inwardly protrude into the core member 30. Such ribs 41 effectively penetrate the core member 30 and extend along an entire vertical length of the core member 30. The ribs 41 are coextensively shaped and are directly coupled, without the use of intervening elements, with the core member 30, which is essential such that the core member 30 is advantageously and effectively prohibited from downwardly traveling beneath the floor surface 11.

Yet again referring to FIGS. 1 and 2, each of the mounting flanges 40 further includes a top surface 42 that is disposed above corresponding ones of the rigid plates 21. Such mounting flanges 40 have respective longitudinal lengths extending downwardly to a bottom surface 33 of the core member 30, as us best shown in FIG. 2. Each of the mounting flanges 40 is also vertically registered along a vertical plane defined subjacent to the floor surface 11.

Referring to FIGS. 1 and 2, a plurality of computer cables 12 are removably passed through the core member 30, thereby causing the core member 30 to laterally expand against the mounting flanges 40 and effectively constrict air gaps created within the core member 30 when the computer cables 12 are passed below the floor surface 11 and into the core member 30. This is a crucial feature such that a secure and generally air-tight relationship is advantageously maintained with the core member 30 after the cables 12 have been positioned through the core member 30. Such an air tight relationship advantageously prevents the shifting of the cables 12 between rigid sections 21. Of course, various alternate conduits and cables may be passed through the core member 30, as is obvious to a person of ordinary skill in the art. Furthermore, of course, the trim plate 20, core member 30 and mounting flanges 40 may be produced in a variety of sizes depending on the amount of cables 12 that must passed through the kit 10, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An insulating kit for providing a barrier through which cables are channeled from one room to another room, said kit comprising:

a trim plate including a plurality of rigid sections contiguously arranged end-to-end and spanning across a floor surface such that said rigid sections define a cavity within an inner perimeter of said rigid sections, each of said rigid sections having corresponding beveled edges outwardly sloping away from associated ones of said inner perimeters;

a core member having a single and unitary body formed from deformably resilient material, said core member being centrally registered between said rigid sections and disposed beneath the floor surface; and a plurality of mounting flanges symmetrically aligned along said inner perimeters of said trim plate and directly abutting said outer perimeter of said core member, each of said mounting flanges being provided with a plurality of monolithically formed ribs inwardly protruding into said core member;

wherein a plurality of computer cables are removably passed through said core member and thereby causing said core member to laterally expand against said mounting flanges and constrict air gaps created within said core member when the computer cables are passed below the floor surface and into said core member.

2. The assembly of claim 1, wherein each of said mounting flanges are removably engageable with said core member and corresponding ones of said rigid sections of said trim plate.

3. The assembly of claim 1, wherein each of said mounting flanges includes a top surface disposed above corresponding ones of said rigid plates, said mounting flanges having respective longitudinal lengths extending downwardly to a bottom surface of said core member.

4. The assembly of claim 1, wherein each of said mounting flanges are vertically registered along a vertical plane defined subjacent the floor surface.

5. The assembly of claim 1, wherein said core member is formed from foam rubber and occupies an entire surface area between said inner perimeters of said trim plate.

6. An insulating kit for providing a barrier through which cables are channeled from one room to another room, said kit comprising:
- a trim plate including a plurality of rigid sections contiguously arranged end-to-end and spanning across a floor surface such that said rigid sections define a cavity within an inner perimeter of said rigid sections, each of said rigid sections having corresponding beveled edges outwardly sloping away from associated ones of said inner perimeters;
- a core member having a single and unitary body formed from deformably resilient material, said core member being centrally registered between said rigid sections and disposed beneath the floor surface; and
- a plurality of mounting flanges symmetrically aligned along said inner perimeters of said trim plate and directly abutting said outer perimeter of said core member, each of said mounting flanges being provided with a plurality of monolithically formed ribs inwardly protruding into said core member, wherein said ribs penetrate said core member and extend along an entire vertical length of said core member;
- wherein a plurality of computer cables are removably passed through said core member and thereby causing said core member to laterally expand against said mounting flanges and constrict air gaps created within said core member when the computer cables are passed below the floor surface and into said core member.

7. The assembly of claim 6, wherein each of said mounting flanges are removably engageable with said core member and corresponding ones of said rigid sections of said trim plate.

8. The assembly of claim 6, wherein each of said mounting flanges includes a top surface disposed above corresponding ones of said rigid plates, said mounting flanges having respective longitudinal lengths extending downwardly to a bottom surface of said core member.

9. The assembly of claim 6, wherein each of said mounting flanges are vertically registered along a vertical plane defined subjacent the floor surface.

10. The assembly of claim 6, wherein said core member is formed from foam rubber and occupies an entire surface area between said inner perimeters of said trim plate.

11. An insulating kit for providing a barrier through which cables are channeled from one room to another room, said kit comprising:
- a trim plate including a plurality of rigid sections contiguously arranged end-to-end and spanning across a floor surface such that said rigid sections define a cavity within an inner perimeter of said rigid sections, each of said rigid sections having corresponding beveled edges outwardly sloping away from associated ones of said inner perimeters;
- a core member having a single and unitary body formed from deformably resilient material, said core member being centrally registered between said rigid sections and disposed beneath the floor surface; and
- a plurality of mounting flanges symmetrically aligned along said inner perimeters of said trim plate and directly abutting said outer perimeter of said core member, each of said mounting flanges being provided with a plurality of monolithically formed ribs inwardly protruding into said core member, wherein said ribs penetrate said core member and extend along an entire vertical length of said core member, wherein said ribs are coextensively shaped and are directly coupled with said core member in such a manner that said core member is prohibited from downwardly traveling beneath the floor surface;
- wherein a plurality of computer cables are removably passed through said core member and thereby causing said core member to laterally expand against said mounting flanges and constrict air gaps created within said core member when the computer cables are passed below the floor surface and into said core member.

12. The assembly of claim 11, wherein each of said mounting flanges are removably engageable with said core member and corresponding ones of said rigid sections of said trim plate.

13. The assembly of claim 12, wherein each of said mounting flanges includes a top surface disposed above corresponding ones of said rigid plates, said mounting flanges having respective longitudinal lengths extending downwardly to a bottom surface of said core member.

14. The assembly of claim 13, wherein each of said mounting flanges are vertically registered along a vertical plane defined subjacent the floor surface.

15. The assembly of claim 13, wherein said core member is formed from foam rubber and occupies an entire surface area between said inner perimeters of said trim plate.

* * * * *